INVENTOR.
RALPH O. EIS

INVENTOR.
RALPH O. EIS

ATTORNEY

United States Patent Office 3,165,655
Patented Jan. 12, 1965

3,165,655
DYNAMOELECTRIC MACHINES
Ralph O. Eis, Schenectady, N.Y., assignor to General
Electric Company, a corporation of New York
Filed Jan. 2, 1962, Ser. No. 163,619
7 Claims. (Cl. 310—54)

The invention described herein relates to dynamoelectric machines and more particularly to a motor cooled by a liquid circulated through the air gap for removing heat generated by the electrodynamically cooperating parts during operation.

Motors of the type involved in this invention are commonly referred to as canned motors which find particular application with pumps useful in circulating liquids under high pressure in nuclear power plants. The motor generally consists of a rotor mounted on a shaft supported at its ends in graphite bearings, and a stainless steel cylinder or can, from which the motor gets its name, is immovably fixed on the rotor peripheral surface for providing an enclosure impervious to the penetration of water. The stator is of the usual construction and includes a magnetic core having windings therein enclosed in a dead air space by an outer shell of U-shape configuration closed at its inner ends by a stainless steel cylinder fixed in the stator bore. The cylinders of the rotor and stator therefore form the air gap for the machine.

The requirement for this kind of construction results from the fact that known pump seals are not currently available for permitting the pumping of high pressure liquids without leakage along the motor-pump shaft. By utilizing the design described above, such leakage is tolerated by permitting it to seep into the motor air gap through an orifice near the motor shaft surface. The same liquid pumped by the pump into an external system is not circulated through the motor but its pressure is reflected therein, thus requiring the use of heavy structural members. The liquid then is used to carry away heat generated by the motor during operation but also serves to lubricate both the guide and thrust bearings used in the machine.

The disadvantages of this kind of construction is the outer shell must be made of an expensive corrosion resistant material of thick cross-section capable of withstanding both the corroding effects of the water and its pressure when circulated through the air gap and in the event of a stator can failure. The U-shaped member therefore must handle the high pressure forces which approach 2000 p.s.i., in addition to the imposed stresses resulting from thermal distortion of the machine parts. The welds joining such parts also are of expensive design and special inspection practices involving the use of X-ray machines are necessary for determining the integrity of the welds. Also, considerable problems are involved in the assembling of the various parts comprising the machine because they must be fabricated, machined and welded together, and upon completion of these steps, machining again must take place to have the parts fit into an integral unit. The manufacturing operations therefore require many heavy structural welds which create inspection and distortion problems in addition to requiring extensive machining to provide the close tolerances between the can support and bearings and the air gap.

Cooling also is a problem because the heat from the winding end turns follows the lowest path of thermal resistance into the magnetic core prior to flowing in a parallel path inward to the high pressure water circulated through the air gap and radially outward through the pressure enclosure of thick material which holds the stator in a stationary position in the machine.

It therefore is apparent that the need exists for an improved motor of this type wherein the steps in the manufacturing process are simplified and reduced in number to provide economical construction while simultaneously providing a machine capable of providing greater horsepower per inch of frame diameter and/or length.

In carrying out my invention, I provide a motor wherein the parts used in this construction are independently fabricated in a parallel operation and then assembled into the unit comprising the motor. Since the parts can be made in this manner, they lend themselves to the elimination of heavy structural welds which heretofore have been required to hold the multitude of parts together. Improved efficiency is obtained by positioning water carrying tubes in heat exchange relationship with the stator core thereby permitting a greater rate of heat dissipation from the windings when the motor is in operation.

While the specification concludes with claims particularly pointing out and distinctly claiming the subject matter which I regard as my invention, it is believed the invention will be better understood from the following description taken in connection with the accompanying drawing in which:

Figure 1:
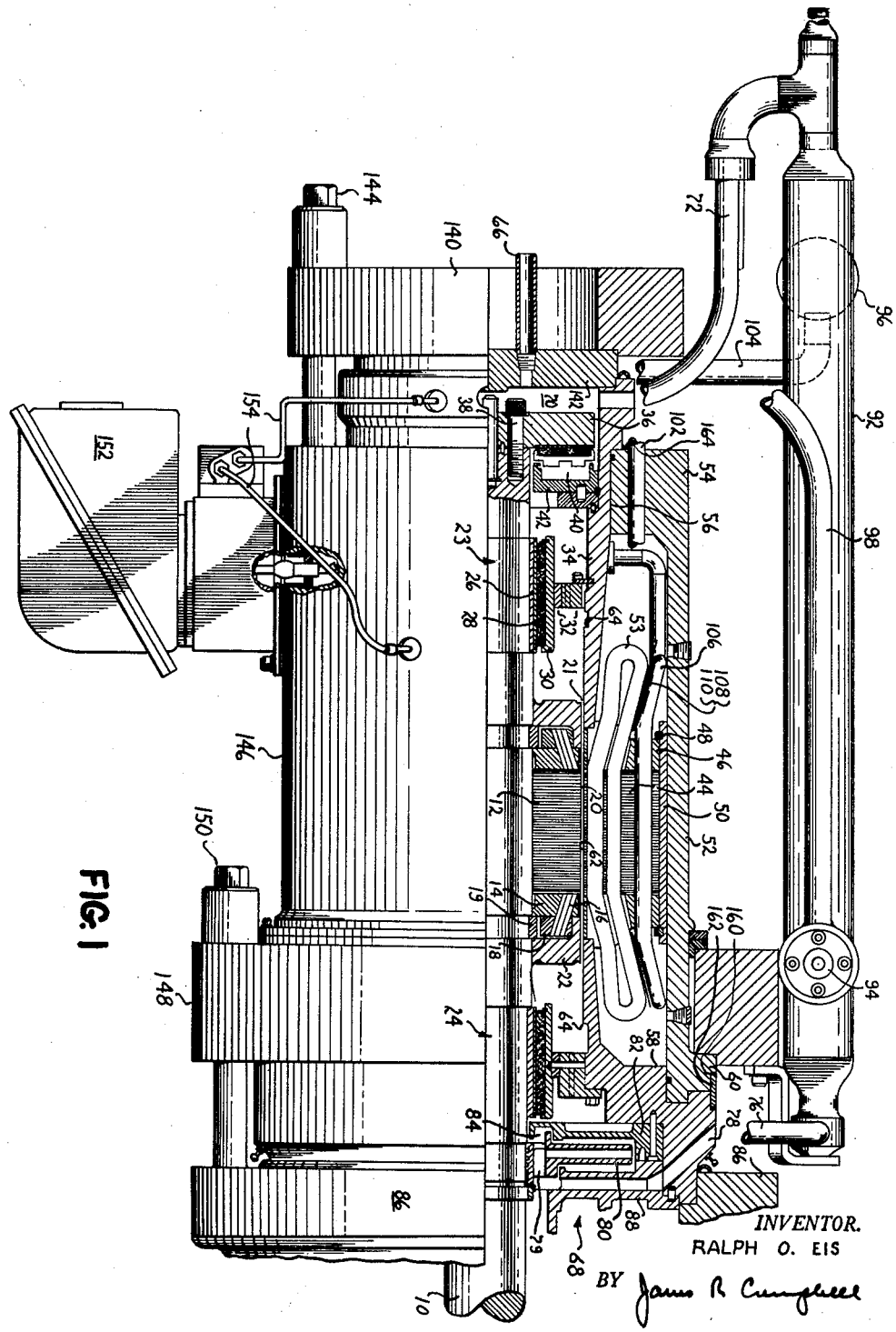
FIGURE 1 is a view in elevation, partly in section, illustrating the disposition in parts of the motor of this invention.

Referring now to the drawings wherein like reference characters designate like or corresponding parts throughout the several views, there is shown in FIGURE 1, a motor comprising a shaft 10 supporting a magnetic core comprising a plurality of laminations 12 held under pressure by finger flanges 14. A squirrel cage winding 16 which terminates in end rings 18, is cast or assembled therein in the usual manner. Keys 19 engage grooves formed on the shaft peripheral surface and serve to hold the flanges in a firm position against the laminations.

A cylinder 20 of non-magnetic steel is then placed over the rotor outer peripheral surface and welded at its ends 21 to the cylinder support rings 22.

The shaft is equipped with a sleeve 26 which forms a journal surface adapted for rotation in bearings 23 and 24, preferably made of graphite. Although any one of a number of hard corrosion resistant materials may be coated on the sleeve surface, a preferred material comprises commercially available Stellite.

The bearing elements consist of graphite shells 28 immovably held in a steel backing sleeve 30. Self-alignment of the bearings is accomplished by a pair of spherically formed seats 32 supported from a can support 34 more fully described hereafter. In order to accommodate the thrust forces during motor operation, a thrust runner 36 is secured to an end of the shaft by a multitude of bolts 38. As in conventional designs, the runner coacts with carbon bearing pads 40 held in a bearing cap 42. The surface of the runner adapted for engagement with the graphite pads also is preferably coated with a hard corrosion resistant material such as Stellite.

The stator for the machine consists of a multitude of silicon steel laminations 44 held under compression by flanges 46 and a key 48 coacting with an inner shell 50 positioned immovably in an outer shell 52 which comprises a pressure enclosure for the motor. The stator core is equipped with a winding 53 in the usual manner.

Referring to the top end of FIGURE 1, it will be seen that the outer shell 52 includes an inwardly directed flange portion 54 having its inner surface 56 adapted for contact with the outer surface of the can support 34. The can support 34 on the bottom end of the stator core has an outwardly directed flange 58 which engages an inner portion of flange 60 formed on the other end of outer shell 52. Appropriate O-rings or other materials are located in grooves formed in the contacting surfaces of these parts for preventing penetration of liquid into the end turn cavity area. A stainless steel cylinder or can 62 is immovably positioned within the stator core and is welded at its ends 64 to the surface of the can support member.

The can support members are preferably made of stainless steel or other hard non-magnetic and corrosion resistant materials for minimizing the possibility of deterioration thereof when contacted by the water circulated through the motor over a long period of time. A particular advantage gained from using this kind of construction wherein the can support members 34 are separate from the outer shell 54 is that the outer shell may be made of low cost low carbon steel material while the relatively small support members contacted by the water can comprise corrosion resistant material. As more fully described hereafter, the utilization of individual parts also permits their manufacture in parallel, thereby allowing the parts to be shipped to a particular area and then directly assembled to form a machine.

As indicated previously, a liquid coolant is adapted to fill the air gap and cavities formed by the rotor and stator peripheral surfaces. Because currently available seals do not have sufficient integrity to effectively seal the shaft of a high pressure pump, leakage of the liquid being pumped is permitted to enter such cavities through a small orifice located adjacent the shaft surface. After the motor-pump assembly is installed in position, liquid from the pump system is permitted to leak through the orifice until all the cavities are completely filled, the air being displaced through a vent tube 66 located in the top of the motor. The orifice is sufficiently small so that little, if any, liquid flows from the pump into the motor. However, the orifice openings are small enough to permit the reflection of the pressure from the discharge side of the pump into the cavities. The function served by the liquid coolant is first, to absorb the heat produced by the electrically operating parts during motor operation, and second, to serve as a lubricant for both the guide and thrust bearings in a manner well known in the art.

Since the liquid serves as a heat transfer agent, a heat exchanger 92 disposed exteriorly of the motor is provided for transferring the heat absorbed by the high pressure liquid to a low pressure water system operating at a temperature substantially less than that of the high pressure liquid in the motor. The reduced size of the orifices along the shaft restrict flow into the cavities, thereby permitting the liquid to be circulated in a closed loop with the heat exchanger.

Considering now the cooling circuit and parts associated therewith, it will be seen that the high pressure liquid which fills the inner confines of the motor is circulated by an attached pump 68 through the motor air gap formed by the cylinders 12 and 20, through the bearings and into the space 70 located on the upper side of the motor. The water is discharged from the motor through a pair of pipes 72 disposed on opposite sides of the top portion of the motor. The liquid flows downwardly through a plurality of tubes of the type found in conventional heat exchangers. It is discharged through pipe 76 at the bottom end thereof prior to being returned through a pair of bored passageways 78 disposed on opposite sides of the bottom portion of the motor and which terminate in an inlet 79 to the pump 68.

As shown, the pump comprises an impeller 80 and a pump diffuser 82 which converts the velocity of the liquid into a pressure head. Discharge from this auxiliary pump is through openings 84 located on the top side thereof. The pressure head developed by the pump is then sufficient to cause circulation of the liquid coolant through the guide bearing 24 and the by-passes therearound before repeating its flow through the machine air gap. The pump 68 is partially contained within a flange 86 comprising part of the primary pump, not shown, and in order to prevent the transfer of heat by conduction from the pump into the motor, a thermal barrier consisting of a circular plate 88 is attached to an end of the can support flange 58 and includes appropriate shoulders 90 for forming a water-tight fit therewith.

As previously indicated, the high pressure liquid being circulated through the motor is cooled in a heat exchanger 92 of conventional design. The water in the low pressure system is introduced into the heat exchanger through an inlet 94 and divides in a parallel path for flow in one direction upwardly through the heat exchanger 92 for absorbing heat conducted through the walls of tubes 74, and is discharged through an outlet 96 located on the upper end of the casing. The temperature of this water is sufficient to absorb heat from the high pressure liquid so that when the latter is re-introduced into the cavities in the motor, it has a temperature sufficient to maintain the motor at an optimum operating temperature. The other path of low pressure water flow is upwardly through the pipe 98 where it enters the top of the motor through an inlet 100 and flows through tubes 102 extending the complete length of the stator core and in a pair of parallel paths, prior to being discharged through pipe 104 to the main outlet 96 where it then flows to a drain, or through a separate thermostatically controlled heat exchange unit. As more clearly shown in FIGURE 1, the tubes extend axially through the stator core and reverse themselves on the opposite ends thereof for flow in an opposite direction up to the top of the motor, in a manner more fully described hereafter.

Referring to FIGURE 1, it will be seen that each of the tubes 106 are located in the stator core and positioned radially outward from the end turns of the winding 53. The tubes are expanded into intimate contact with the multiplicity of laminations comprising the stator core and therefore are held in an immovable position therein. In the above discussion of the prior art, it was pointed out that the magnetic core of the stator comprised a heat sink into which heat flowed from the end turns and in a direction radially outward to the outer shell 52 where it then was absorbed either by air or by a heat exchanger wrapped on the outer shell peripheral surface. The other direction of heat travel from the end turns was toward the air gap where it was picked by the circulating water and carried to a heat exchanger for dissipation therein.

An important feature of this invention is that since the tubes 106 are positioned in the core, and in spaced relation with the end turns 54, the heat from the latter flows to the area of lower temperature, i.e., the tubes, where it is absorbed by low pressure liquid flowing therein and then circulated to the heat exchanger 92 where the heat is dissipated. Obviously, some of the heat may flow into the liquid being circulated through the air gap. In order to achieve the transfer of heat from the end turns directly to the tubes 106 and also to minimize the likelihood of a short circuit being established between the winding end turns and the water carrying tubes which are at ground potential, a sheet of relatively heavy gauge copper 108 fashioned to a conical shape is placed in intimate contact with the tubes adjacent the end turns. A layer of mica insulation 110 is then placed between the tubes and the winding end turns and the whole unit then is pressed or wedged into intimate contact with each other. This construction brings a heat sink of low temperature into close proximity with the hottest spot of the winding which is in the end turn area, thereby establishing an effective heat transfer path between the water carrying tubes and the end turns. Also, the dielectric reliability of the winding system is not compromised because the mica insulation isolates the current carrying end turns from the tubes containing the low pressure water.

Figure 2:
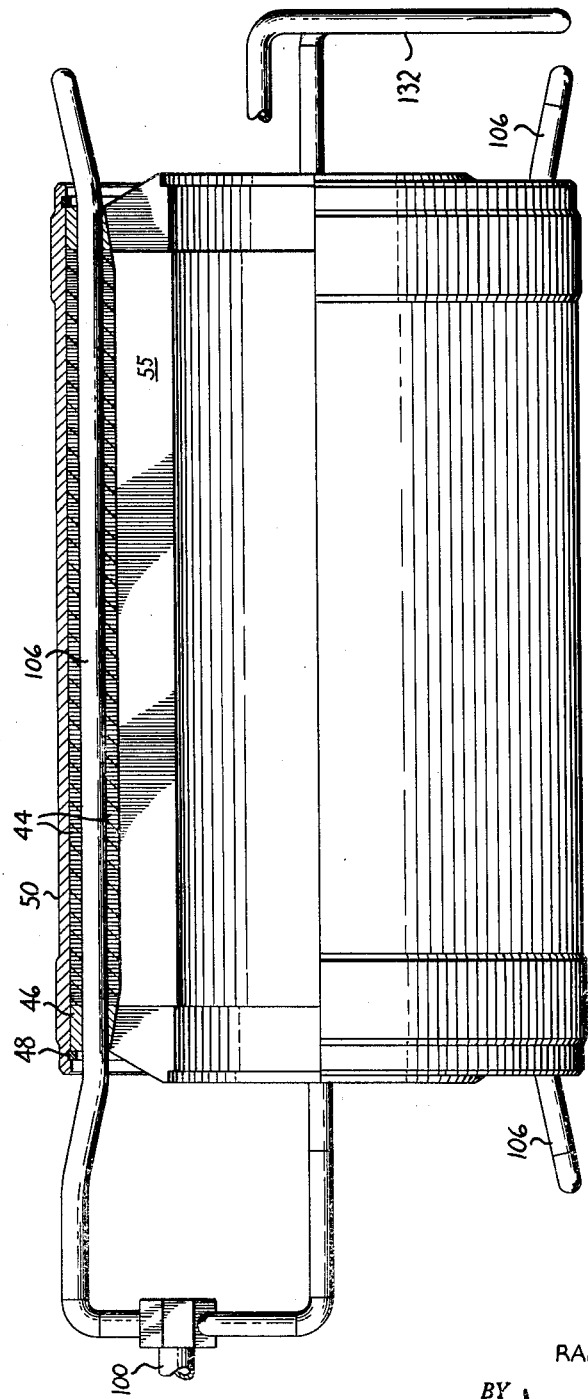
FIGURE 2 is a view in elevation, partly in section, of a portion of the stator illustrating the arrangement of heat exchange tubes positioned in the magnetic core.
Figure 4:
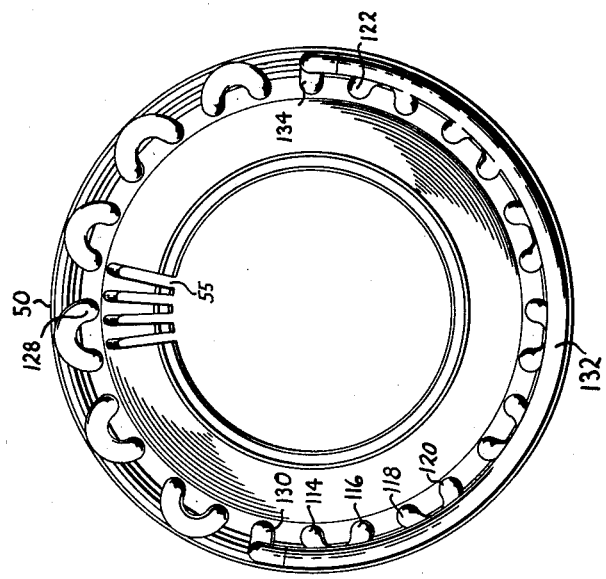
FIGURE 4 is a bottom view of the stator in FIGURE 2.
Figure 3:
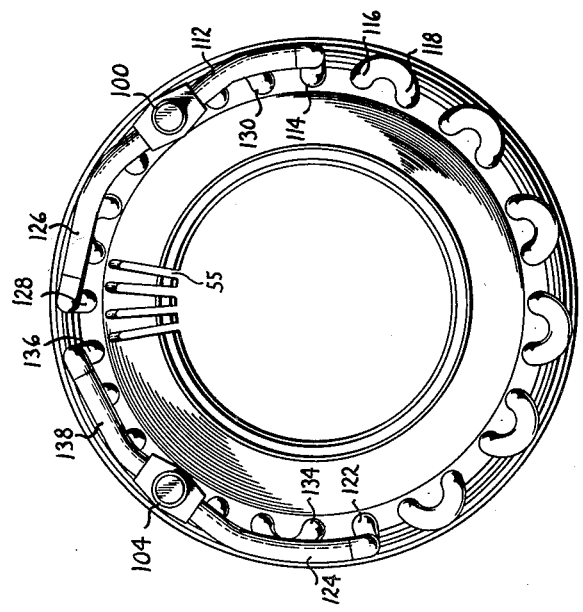
FIGURE 3 is a top view of the stator shown in FIGURE 2.

The disposition of the tubes 106 in the stator core is such that they extend completely around the core as illustrated in FIGURES 3 and 4, which respectively are top and bottom views of the stator core, not including the windings. Referring to FIGURES 2, 3 and 4, the low pressure water is introduced into the inlet 100 and flows circumferentially through pipe 112 and downwardly through tube 114. It makes a 180° turn at the bottom and then flows upwardly through tube 116 and then downwardly through tube 118, reverses itself at the bottom and flows upwardly through tube 120. This path of water flow then continues through the tubes which are connected in series, in the manner just described, circumferentially, and in a clockwise direction as illustrated in FIGURE 3. It then finally flows upwardly through tube 122 into the outlet pipe 124 and the main outlet 104 to the piping system.

The other path of flow takes place in a counterclockwise direction in FIGURE 3 wherein the low pressure water introduced through inlet 100 flows through pipe 126 and downwardly through pipe 128 and sequentially through the vertically extending tubes and around the stator core in a clockwise direction in FIGURE 3 and finally down through tube 130 and into semi-circular pipe 132 located adjacent the bottom of the stator core and up tube 134 and then sequentially and in a counterclockwise direction through the vertical tubes until it finally flows upwardly through tube 136 prior to entering pipe 138 which has access with the outlet 104 connected at the top of the stator.

When the parts including the heat exchanger and its associated tubes are all connected together, upper flange 140 which holds top plate 142 firmly against the can support member 34, is secured by bolts 144 to housing 54. The bottom part of the motor housing 146 also includes a flange 148 of thick cross-section which serves to hold pump flange 86 in waterproof contact with the bottom end of the motor housing. Bolts 150 firmly tie the motor and pump flanges together. A conduit box 152 encloses leads necessary for supplying power to the stator windings and thermocouple leads 154 and 156 respectively extend to temperature sensing devices, not shown, located in the motor for detecting the bearing and winding temperatures.

The two major improvements of significance in this invention is that of locating the heat exchange tubes 106 in the stator core in close proximity to the winding end turns for absorbing heat developed in the winding during operation. By utilizing this kind of construction, the cooling is so effective as to permit a very substantial reduction in size of the motor for the same horsepower rating.

The other improvement of significance is that of designing the parts in a manner to eliminate the heavy structural welds in the massive outer shell which heretofore was necessary for furnishing the strength necessary for withstanding the high pressure forces of the liquid circulated through the air gap. As clearly shown in FIGURE 1, the multitude of shoulders machined on the numerous parts enclosing the stator core allow the parts to be assembled together without requiring the use of heavy structural welds. The only welds which must be removed to permit disassembly of the parts are those small seal welds 160 used for joining plate 162 to the outer shell 52 and the cylinder support 34. A small seal weld 164 also is used for sealing the other end of the outer shell with the cylinder support 34 located on the upper part of the motor. Water-tight integrity is imparted to the motor by the use of the upper and lower flanges 140, 54, 148 and 86 and bolts 144 and 150 which draw all of the parts into a complete integral unit. Because the design of the individual elements used in the machine are particularly chosen to mesh together during the assembly process, each part can be individually manufactured and machined, and then shipped to a factory area where they are assembled together to form the machine.

In view of the above, it will be apparent that many modifications and variations are possible in light of the above teachings. It therefore is to be understood that within the scope of the appended claims, the invention may be practiced other than as specifically described.

What I claim as new and desire to secure by Letters Patent of the United States is:

1. A dynamoelectric machine comprising a shaft supporting a rotor including a multiplicity of laminations held under compression and a winding disposed in its peripheral surface, first support members disposed on opposite ends of said rotor and a cylinder enclosing said laminations and positioned in water-tight relationship with said support members for preventing the infiltration of liquid into the rotor, means supporting said shaft in guide bearings and a thrust bearing associated with said rotor for absorbing thrust forces imposed thereon during motor operation, a stator for said machine comprising a magnetic core including laminations held under compression and a winding disposed in its peripheral surface, a second pair of cylinder support members of corrosion resistant material extending axially outward from the ends of said core but in contact therewith, a cylinder of nonmagnetic material positioned in immovable relationship with the inner surface of the core and joined at its ends to said second support members, an outer shell having flanges disposed on opposite ends thereof and designed for respective contact with said second cylinder support members thereby enclosing said magnetic core in a dead air space, coolant means placed in contact with said core for absorbing heat generated therein during machine operation seal welds sealing the juncture of said cylinder support members and said outer shell for forming a fluid-tight fit for the stator, and second flanges spaced from the shell flanges but secured thereto by bolts for holding the stator components together as an integral unit, thereby eliminating the need for heavy structural welds in the motor.

2. The combination according to claim 1 wherein said coolant means comprises a multiplicity of axially extending but circumferentially spaced tubes positioned in said core, means connecting said tubes on the opposite ends of said core in such a manner as to have coolant flow therethrough in a series path, and an inlet and an outlet for said tubes through which said coolant is conducted for cooling said core.

3. The combination according to claim 2 wherein insulating means are disposed between the end turns and said tubes for providing a path of low thermal resistance from the end turns to said tubes, and for providing a dielectric barrier between the end turns and said tubes.

4. A dynamoelectric machine comprising a shaft supporting a rotor having a winding therein and means disposed on opposite ends of the core for supporting a stainless steel cylindrical member positioned around the outer surface of the rotor for enclosing said rotor in a water-tight housing, guide and thrust bearing means connected with the shaft for furnishing support thereto and for absorbing thrust forces generated during machine operation, a stator comprising a magnetic core having a winding therein and heat exchange tubes in said core extending axially but being circumferentially spaced from each other, means enclosing said stator with its windings and tubes in a dead air space, means connecting the opposite ends of said tubes together to form a path for the flow of liquid coolant therethrough, an inlet and an outlet connected with said tubes and to a source of low pressure liquid coolant supply for circulating the coolant through said tubes in the core for carrying away heat generated therein during operation, a second coolant system for said motor comprising a pump driven by said shaft and having communication with the air gap formed by the rotor and stator for circulating a high pressure liquid therethrough in a closed circuit with an external heat exchanger, and means connecting the inlet and discharge sides of said heat exchanger to the inlet and outlet of said pump.

5. The combination according to claim 4 wherein a flange on a housing enclosing a pump useful in circulating a high temperature liquid in a primary liquid system is adapted for connection to a flange member on the bottom side of said motor, and thermal barrier means positioned between said flange and said flange member for restricting the transmission of heat to the motor from the high temperature liquid circulated by the primary system pump.

6. The combination according to claim 5 wherein said means closing said stator core in a dead air space comprises a pair of oppositely disposed cylinder support members extending axially outward from said stator core but in contact with the ends thereof, a pressure enclosing member having flanges disposed on its opposite ends in contact with said cylinder supports, and flange members disposed on opposite ends of the motor being bolted to said means for holding the members comprising the means closing the stator in fluid-tight relationship with each other and lightweight seal welds joining the last-named members for preventing ingress of liquid into the closed stator core and thereby eliminating the use of heavy structural welds in the motor.

7. The combination according to claim 4 wherein the end of said tubes projecting outwardly from opposite ends of said core are positioned in spaced relationship with the end turns of said winding, and insulating means disposed between said tubes and said end turns for facilitating the transfer of heat from the end turns to the tubes and for providing a dielectric barrier of sufficient strength to prevent the establishment of short circuits in the event the ground insulation on the end turns of said winding fails.

References Cited in the file of this patent

UNITED STATES PATENTS

| | | |
|---|---|---|
| 1,384,865 | Shepherd | July 19, 1921 |
| 1,494,715 | Schroeder | May 20, 1924 |
| 1,761,387 | Gay | June 3, 1930 |
| 1,853,646 | Von Kando | Apr. 2, 1932 |
| 2,727,164 | Radice | Dec. 13, 1955 |
| 2,913,988 | White | Nov. 24, 1959 |

FOREIGN PATENTS

| | | |
|---|---|---|
| 964,162 | Germany | May 16, 1957 |